Dec. 21, 1943.    E. W. DECK    2,337,087
BLOWPIPE APPARATUS
Filed July 18, 1940    2 Sheets-Sheet 2
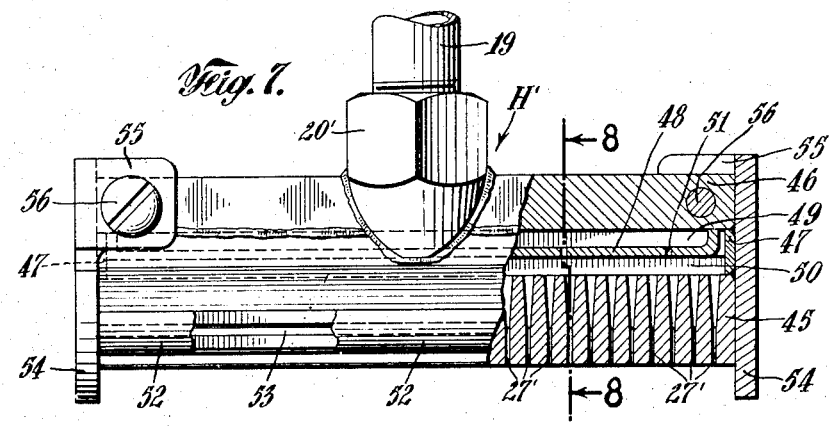
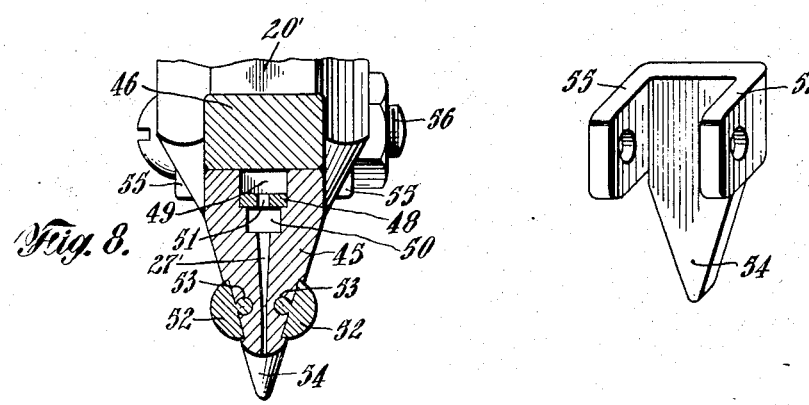
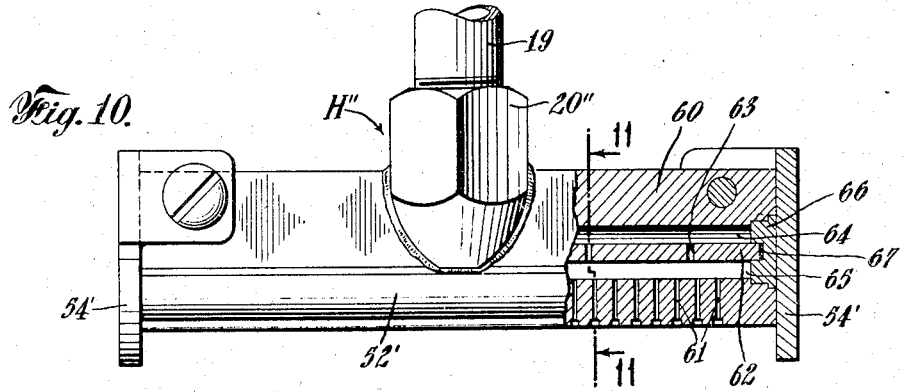
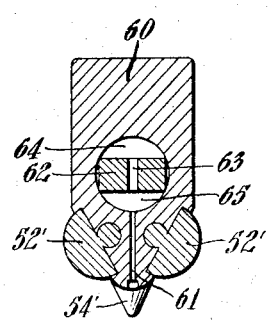
INVENTOR
EIBE W. DECK
BY
ATTORNEY Patented Dec. 21, 1943

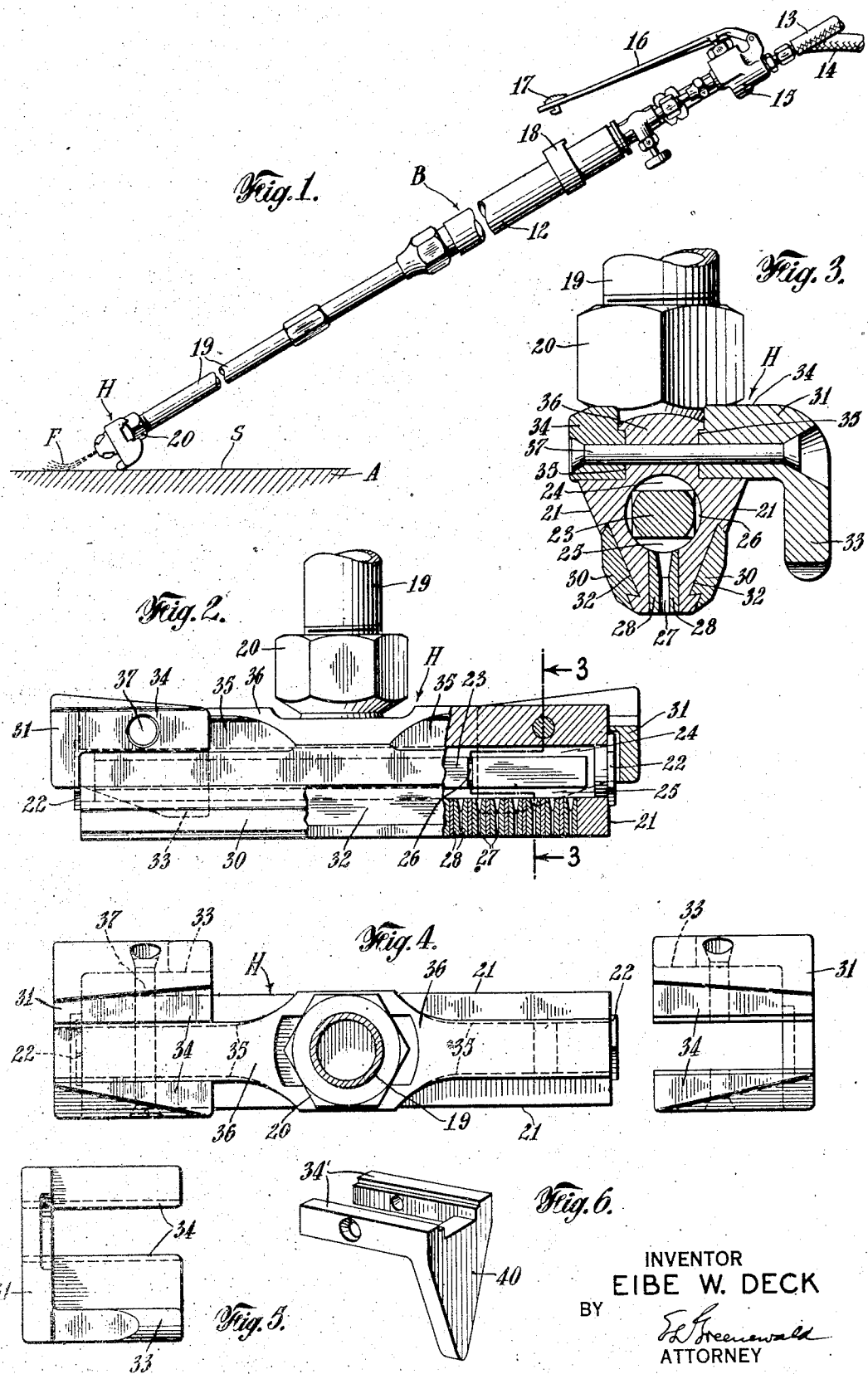

2,337,087

UNITED STATES PATENT OFFICE 2,337,087

BLOWPIPE APPARATUS

Eibe W. Deck, Plainfield, N. J., assignor to Union Carbide and Carbon Corporation, a corporation of New York Application July 18, 1940, Serial No. 346,098

14 Claims. (Cl. 29—81)

This invention relates to blowpipe apparatus, including a blow pipe having a head adapted to produce a plurality of high temperature heating flames, and more particularly to blowpipe apparatus for use in removing adhering material from the surface of an article.

In addition to the removal of paint from metal surfaces by so-called "burning," single or multiflame blowpipes (by the latter of which a greater area of surface can be treated in a shorter time) can be used effectively for the removal of scale, rust, or other adhering material from a surface of an article, particularly a metal article. However, to obtain the best results most economically, it is desirable in many instances to utilize special equipment developed particularly for the purpose.

Rust normally has a brown color and ordinarily forms on a steel or other ferrous metal article while the article is exposed to the weather at normal temperatures. Rust cannot be removed by heating alone, but heating sufficiently to cause the color of rust to change from brown to black increases to a considerable degree the ease with which the rust may be removed by a wire brush or similar device. A possible explanation of the above is that ordinary rust is a brown ferrous oxide, $Fe_2O_3$, containing considerable moisture or water of crystallization, and heating not only drives off moisture and water of crystallization, but also causes a chemical reaction by which the rust changes to an anhydrous black ferric oxide, $Fe_3O_4$. The latter apparently adheres less tenaciously to the surface beneath, and thus is more easily removed.

Scale may be removed by heating, but in a slightly different manner. A sufficient amount of heat, applied relatively quickly, will cause a differential expansion between the scale and the surface underneath, or between the top and bottom of the scale, the latter effect being the more desirable since certain types and thicknesses of scale cannot be effectively removed by causing the former to take place. The differential expansion of the scale causes the scale to become loosened, and particularly when a differential expansion between the top and bottom of the scale is produced, the scale will pop or fly off in relatively large chunks, since the bottom of the scale is not heated sufficiently to lose its brittleness. Of the two principal types of scale—the first being a gray scale formed at quite high temperatures, of the order of 2200° F. and involved in hot forging, rolling, etc., and the second being a black or sometimes reddish scale formed at lower temperatures, such as those around the critical range and up to 1600° F. and involved in hardening, annealing, and cold forging and rolling—the first type is normally thicker but the second is more tenacious and thus more difficult to remove. Removal of scale is a problem of particular importance in the processing of steel in a mill. Blooms, billets, bars, etc., after passing through a rolling mill, are normally covered with either or both types of scale, and such scale must be removed in order to ascertain by inspection the extent of defects, such as slag inclusions, which themselves must be removed. Such scale can be removed most effectively and quickly by moving a plurality of high velocity and high temperature heating flames along the surface of the bloom or billet to effect a differential expansion between the top and bottom of the scale itself, even when the bloom or billet is relatively warm, although difficulty is usually experienced when the scale and bloom or billet are above 700° F. because of the ductility and loss of brittleness of the scale and also the tendency for the scale to fuse in place when heated above such temperature.

The greatest rate of heat transfer, and thus the greatest rapidity of operation, can be obtained by high velocity and high temperature heating flames. One highly satisfactory manner of producing the desirably high velocity and high temperature heating flames is disclosed and claimed in my application Serial No. 259,495, filed March 3, 1939, patented May 12, 1942, Patent No. 2,282,397. The blowpipe head disclosed therein is so constructed that the combustible mixture is preheated during passage through the head to the discharge outlets, which are preferably long and narrow and are provided with tapering approach sections, to produce heating jets having a velocity in excess of 600 ft./sec. The apparatus disclosed therein is particularly adapted to be used in removing scale from blooms, billets, bars and the like, in a steel mill, but can be used effectively in removing black scale alone, or gray scale alone, from ferrous metal articles of various types. Apparatus which provides less than the maximum rate of heat transfer can be used in the removal of gray scale alone, but the highest rate of heat transfer permits the most effective removal and the fastest rate of operation, or relative speed of traverse of the heating flames along the surface from which scale is to be removed.

Another field of considerable commercial importance is the preparation of metal or other articles for painting. High temperature heating flames are used advantageously in the removal of an old coat of paint prior to repainting, or in the removal of rust and scale from castings which have been exposed to the weather for some time, or rust and scale combined with dirt and grease, prior to painting. An outstanding advantage in the removal of such rust, scale and other adhering material in this manner lies in the fact that substantially all moisture is driven off. A coat of paint applied to a surface so treated, and especially while the surface is still warm, remains longer, does not flake off in spots, and adheres more tenaciously. This is probably due to the absence of moisture under the paint after it is applied, and also due to the decrease in surface tension of the paint when warmed by the surface and the resultant greater initial adherence of the paint to the surface. In addition to the treatment of castings or fabricated articles in a shop prior to application of an initial coat of paint, the removal of adhering material by high temperature heating flames is particularly advantageous in the case of bridges, trestles, and other outdoor structures which are to be repainted, or painted for the first time.

The apparatus of the present invention is useful in removing all types of scale, but is particularly useful in the removal of paint, rust, rust and scale, in uncovering countersunk rivets on boat hulls, etc.—in fact, all adhering materials encountered at construction operations, machine shops, factories, dry docks, and similar places.

Particularly in the treatment of fabricated structures such as bridges and trestles, the blowpipe apparatus used is likely to receive quite rough treatment, such as in passing over rivets, sliding along sharp corners of plates and flanges, or when used in corners, etc. Also, when the apparatus is to be used without interruption for a long period of time, the blowpipe head tends to become overheated to a sufficient extent to cause damage to the head and/or pre-ignition of the combustible mixture before it reaches the discharge outlets. Of course, the head can be cooled by circulating a cooling medium therethrough, but the efficiency of the operation and the ease of handling of the apparatus are reduced thereby.

Among the objects of this invention are to provide apparatus for removing adhering material from the surface of an article which includes a blowpipe head protected from the effects of rough usage; to provide such apparatus which is light in weight and which can be used for long periods of time without interruption; to provide such apparatus which includes a blowpipe head in which the velocity of the heating flames is increased by preheating of the combustible mixture but in which pre-ignition of the combustible mixture is prevented by reducing the time during which the combustible mixture remains in the head; to provide a novel blowpipe head for producing a plurality of high temperature heating flames; to provide such a blowpipe head in which the discharge outlets are relatively long and narrow and have a tapering approach section; to provide a novel construction of blowpipe head whereby the body thereof may be formed of a solid block of metal, but relatively long outlets having a tapering approach section may be provided at a minimum manufacturing cost; and to provide such a blowpipe head in which the combustible mixture is distributed to a plurality of outlets, but in which the tendency for the combustible mixture to become overheated is overcome. Other objects and novel features of this invention will become apparent from the following description and accompanying drawings, in which:

Fig. 1 is a side elevation of apparatus, including a blowpipe head constructed in accordance with this invention, in operative position for removing scale or other adhering material from the surface of an article;

Fig. 2 is a front elevation of the blowpipe head forming a part of the apparatus of Fig. 1, the head being partly broken away to show the interior construction;

Fig. 3 is an enlarged vertical sectional view taken along line 3—3 of Fig. 2;

Fig. 4 is a top view of the blowpipe head of Figs. 1 and 2, with an end skid spaced therefrom to illustrate more clearly the shape of the end skids and the manner of attaching the same to the head;

Fig. 5 is a bottom view of such an end skid;

Fig. 6 is a perspective view of an alternative type of end skid;

Fig. 7 is a front elevation of an alternative blowpipe head, partly broken away to show the interior construction;

Fig. 8 is an enlarged vertical sectional view, taken along line 8—8 of Fig. 7;

Fig. 9 is a perspective view of an end skid forming a part of the blowpipe head of Fig. 7;

Fig. 10 is a front elevation of another alternative blowpipe head, partly broken away to show the interior construction; and Fig. 11 is an enlarged vertical sectional view, taken along line 11—11 of Fig. 10.

Apparatus for removing rust, scale, or other adhering material from a surface S of an article A, as in Fig. 1, may include a blowpipe B having a head H constructed in accordance with this invention and from which a plurality of high temperature heating flames F are directed against the adhering material on surface S. The head H is so constructed that the combustible mixture which forms heating flames F is preheated during passage therethrough, and the outlets through which the combustible mixture is discharged are suitably shaped, so that high velocity and high temperature heating flames are formed. Also, the velocity of the combustible mixture in passing through the head to the outlets is sufficiently high so that pre-ignition of the combustible mixture is avoided. These and other features of head H will be more clearly apparent from a later detailed description of the same.

The blowpipe B may be constructed in any conventional manner. As illustrated herein, the blowpipe B includes a body 12 which is provided with a suitable mixer and valves for regulating the flow to the mixer of a combustion-supporting gas and a combustible gas, such as oxygen and acetylene, respectively. Oxygen and acetylene, the heating gases, are supplied to the blowpipe B by hoses 13 and 14, respectively, the heating gases first passing through a gas-saver valve 15, the handle 16 of which is depressed to turn on the heating gases. Gas-saver valve 15 controls simultaneously the flow of both oxygen and acetylene to the blowpipe, and permits the regulating valves to remain in any desired adjusted position while the heating gases are shut off.

The end of handle 16 is provided with a sliding lock 17 adapted to engage a projection formed on a collar 18, attached to the body of the blowpipe, so that the valve 15 may be locked in the "on"

position during the removal of scale or other adhering material over an extended period of time. The combustible mixture of gases passes from the forward end of the blowpipe through a tube 19, the lower end of which threadedly engages an inlet connection 20 of head H.

The head H, as in Figs. 2–4, includes a relatively long, elongated body 21, which is formed from a solid block of copper, brass, or other suitable metal preferably having a high rate of heat conductivity, and the sides of which taper downwardly toward the lower end thereof. A cylindrical chamber extends centrally through body 21, and the ends thereof are closed in a suitable manner, such as by plugs 22 which are secured to the body 21 in any suitable manner, such as by silver soldering. A baffle 23 divides the chamber into an upper passage 24 and a lower passage 25. The combustible mixture is delivered to the upper passage 24 through inlet connection 20, and flows to the lower passage 25 through restricted channels 26 formed by the inner surface of the chamber and a plurality of spaced grooves or notches cut in the sides of baffle 23. From the lower passage 25, the combustible mixture is discharged through a longitudinal row of outlets 27.

Outlets 27 are spaced relatively close together so that the heating flames tend to overlap, simulating a ribbon-like flame, and each outlet is relatively long and narrow and also is provided with a tapering approach section. Each outlet is formed in an insert 28, the inserts being formed in any suitable manner, preferably by swaging and reaming; and each insert is secured in a suitable manner, such as by silver soldering, in a hole drilled in the lower end of the body. As shown, the outlet end of each insert terminates substantially flush with the surface adjacent the hole or aperture in which the insert is secured. Baffle 23 is preferably rectangular in shape and formed of relatively hard metal, so that with a drive fit, the corners of the baffle will engage the inner surface of the chamber to prevent the baffle from turning in the chamber during use; but the baffle may have a shape other than rectangular, and the chamber a shape other than cylindrical. In any event, the baffle is preferably of such a size that it nearly fills the chamber and the upper and lower passages 24 and 25 are sufficiently reduced in cross-sectional area so that the combustible mixture passes through the head with a considerable velocity. The restricted channels 26 also are of such a size as to assist in producing the desired velocity of the combustible mixture, and, in addition, distribute the combustible mixture uniformly and directly from the upper passage to the lower passage and outlets and thus assist in avoiding the presence of stagnant pockets of combustible mixture. Through the velocity and relatively rapid flow of the combustible mixture through the head to prevent overheating and pre-ignition, and also through the avoidance of relatively stagnant pockets of gas, the apparatus can be used without interruption for long periods of time. However, at the same time, the combustible mixture is effectively preheated during passage through the head due to the high rate of heat conductivity of the copper or other metal of which the body 21 of the head preferably is formed, thus increasing the flame temperature and therefore the efficiency of operation.

While the heat conductivity of the material such as copper, of which the body of the head H is made, is advantageous from the standpoint of effective preheating of the combustible mixture, such material is relatively soft and thus becomes worn from sliding on a rough surface and is easily damaged by striking an object, such as a rivet, or a beam flange, with any considerable amount of force. Consequently, the head is provided with a pair of side skids 30 and a pair of end skids 31. Each pair of skids is formed of a suitable material, such as a tungsten-cobalt-chromium alloy known as "Stellite," which is more resistant to heat, wear, and abrasion than copper. Side skids 30 are preferably formed by casting, and, as in Figs. 2 and 3, are provided with laterally extending tongues which fit into longitudinal grooves 32 machined in the tapered sides of body 21. Side skids 30 preferably extend downwardly on each side of the head to a point closely adjacent the lower end thereof. Side skids 30 may be slid into grooves 32 from the end of the head, and further secured in position by being silver soldered or tack welded to the body 21 at a few points.

Each of end skids 31 is similar in shape but reversed in configuration, and preferably is formed by casting. Each end skid extends downwardly over the end of body 21, to protect the body, and particularly plugs 22, from damage, particularly when the apparatus is being used in a corner or other confined space, or alongside a beam flange or other part extending above the surface being treated. A rear leg 33 of each end skid extends downwardly to a point at the rear of the head, as in Fig. 3, the lowest point of each leg being spaced inwardly from the end of the head to permit either end of the head to pass over rivets or other projections extending from the surface to be treated.

By tipping the head back on legs 33, as in Fig. 1, the head may be positioned at any angle with respect to surface S, and with outlets 27 spaced at any desired distance from the surface. As illustrated in Fig. 1, the heating flames F are directed forwardly at an angle of about 30° with respect to the surface. Such positioning is desirable in removing scale, rust, paint, etc. from an article, since the high velocity, high temperature heating flames quickly heat successive portions of the material to be removed and permit a relatively high speed of traverse. Of course, should more tenaciously adhering material be encountered, it normally will prove desirable to direct the heating flames in a more nearly perpendicular direction with respect to the surface, and cause the heating flames to impinge closer to the head.

The head H may be either pushed or pulled along the surface. In some instances, it is desirable to pull the head along the surface, as to the right in Fig. 1, so that loosened scale or other material will not be encountered after having been removed.

For the purpose of securing the end skids to the head, each end skid is provided with a pair of forwardly extending arms 34, the rear arm and leg 33 being integral. Arms 34 are provided with tongues which engage grooves 35 machined on either side of a rib 36 at either end of the head. As will be apparent from Fig. 4, each skid 31 is adapted to be slid into place from the end of the head. To hold each end skid securely in place, a countersunk rivet 37 passes through suitable holes in arms 34 and rib 36, the end of the rivet being peened outwardly in the conventional manner. Other suitable means, such as bolts, may be used instead of rivets but countersunk rivets have been found to be more satisfactory for rough usage, since there is a lesser tendency for them to become loosened.

Periodically, the rivets are removed, the end skids taken off, plugs 22 removed by applying a small blowpipe flame to melt the silver solder securing the plugs to body 21, and the combustible gas passages blown out by compressed air directed through the outlets. This removes any carbon deposits, or other material which would tend in time to clog the outlets if it were permitted to accumulate. While threaded connections would make disassembly of the head more convenient, the character of the work on which the apparatus of Fig. 1 is normally used, is such that the sturdiest construction is normally the most desirable.

A simplified type of skid, such as skid 40 illustrated in Fig. 6, may be used in lieu of end skids 31. The end skid 40 of Fig. 6 is provided with a pair of inwardly extending arms 34' having tongues adapted to fit into grooves 35 of body 21, but the end of skid 40 is substantially triangular in shape and extends downwardly to a point below the lower end of the head to space the flames from the work. Skids of this type are particularly useful when the apparatus is to be used in more nearly an upright position than is illustrated in Fig. 1.

Alternative head H' of Figs. 7 and 8 is adapted for slightly less rough usage than head H, and also may in some instances be easier to manufacture. Swaging is a particularly economical method of making inserts 28 of head H, but where suitable apparatus for the purpose is not available, or where machining operations are cheaper, a head of the type of head H' may be made. In head H', a longitudinal row of outlets 27' which have a relatively long discharge section and a tapering approach section, are machined in an elongated lower block 45 which is afterward secured to an elongated upper block 46 in a suitable manner such as by welding, brazing, or silver soldering. A longitudinally extending combustible mixture chamber is formed between the upper and lower blocks by a suitable groove or slot in either block—as illustrated, by a substantially rectangular groove formed in the lower block. The ends of this chamber are closed by plugs 47, which are welded, brazed, or otherwise suitably secured to the upper and lower blocks. A baffle 48, resting on shoulders formed in the lower block and having upturned ends engaging the upper block, divides the chamber into an upper passage 49 and a lower passage 50. The combustible mixture is led into the upper passage 49 through an inlet connection 20', to which the tube 19 of blowpipe B of Fig. 1 may be threadedly secured. Inlet connection 20' is welded or otherwise secured to the upper and lower blocks after assembly of the latter. Baffle 48 may be formed of a metal strip provided with a plurality of gas distributing holes 51 which form restricted channels to lead the combustible mixture from the upper passage to the lower passage, and to distribute the combustible mixture evenly to outlets 27'.

The sides of the lower block 45 taper downwardly, as in Fig. 8, the lower block being rounded off at the bottom. Side skids 52 are secured to the lower block on each side thereof adjacent the lower end by tongues fitting into grooves 53 formed in the lower block. The head H' is also provided with a pair of end skids 54, each similar to skid 40 of Fig. 6 in that the end thereof extends downwardly to a point below the bottom of lower block 45 as in Fig. 8. The lower ends of skids 54 are adapted to rest upon the work to space the outlets the proper distance from the work, and the end of each skid 54 is otherwise similar in shape to the cross-section of the upper and lower blocks when the latter are assembled, thereby covering the ends of grooves 53 and rendering it unnecessary in most instances to tack weld side skids 52 to the lower blocks. Each end skid is provided with a pair of inwardly extending ears 55, through which these skids are secured to the head by suitable means, such as bolts 56 which extend through suitable holes in ears 55 and upper block 46.

Alternative head H'' of Figs. 10 and 11 is relatively cheaper to manufacture than the other heads, but does not provide heating jets having quite as high a velocity as the jets produced by heads H and H', thereby being of less usefulness in the removal of heavier and/or more tenacious scales. A body 60 of head H'' is formed of a solid block of copper or other suitable material of high heat conductivity, and outlets 61 do not have tapering approach sections, but are enlarged at their lower ends to prevent extinguishment or popping out of the flames, usually caused by flying scale. Body 60 is provided with a tapered lower end and a longitudinal gas distributing chamber, the latter of which may be circular in shape, as shown. A rectangular baffle 62, which is preferably formed of a strip of metal and which is provided with a row of distributing holes 63 drilled centrally therethrough, divides the chamber into an upper passage 64 and a lower passage 65, from the latter of which outlets 61 lead. The combustible mixture may be supplied to the upper passage 64 through an inlet connection 20'' which is welded to body 60, and to which tube 19 of blowpipe B of Fig. 1 may be threadedly secured. The combustible mixture passes from upper passage 64, through holes 63 in baffle 62, into lower passage 65 and thence into outlets 61, to which the combustible mixture is evenly distributed through holes 63.

Each end of the chamber in body 60 is closed by a plug 66 secured to the body in a suitable manner, such as by welding or silver soldering. Plugs 66 are provided with inner slots 67, in which baffle 62 fits, thereby preventing the baffle from becoming twisted or dislodged from its proper position during use. Of course, a drive fit between the baffle and the chamber may be utilized to position and secure the baffle properly. Also, the shape of the chamber and baffle may be altered as desired.

Head H'' is provided with side skids 52' and end skids 54', which are similar in construction and secured to the head in the same manner as, side skids 52 and end skids 54, respectively, of head H'. Side skids 52 and 52', as well as end skids 54 and 54', are formed of material which is more resistant to heat, wear, and abrasion than copper. As mentioned previously in connection with the side and end skids of head H, the side and end skids of heads H' and H'' are preferably made by casting a suitable material, such as the previously mentioned alloy of tungsten, cobalt, and chromium.

From the foregoing, it will be apparent that there is provided by this invention apparatus for removing adhering material by heating flames which is light in weight and which includes a blowpipe head adapted to produce a plurality of high temperature and high velocity heating flames, such a blowpipe head being rugged in construction and able to withstand the roughest usage. It will also be apparent that there is provided by this invention an alternative blowpipe head which will be cheaper to manufacture in certain instances, though not quite as rugged, and a second alternative type of blowpipe head which is still cheaper to manufacture and which is highly satisfactory for most operations involving the removal of less heavy or less tenacious materials. It will be understood that wide variations in the shape, size, and constructional features, are permissible, and that other variations may be made which will not depart from the spirit and scope of this invention, as defined in the appended claims.

What is claimed is:

1. A blowpipe head for producing a plurality high temperature heating flames, comprising an elongated metal body having a chamber formed therein; a combustible mixture inlet leading to the upper portion of said chamber; a plurality of outlets leading from the lower portion of said chamber; and a baffle disposed within said chamber and adapted to divide said chamber into upper and lower passages, said baffle and said chamber being of such a size relative to each other that each of said passages is sufficiently small to cause the combustible mixture to flow through said head with a velocity sufficient to prevent preignition of the combustible mixture within said head during relatively long periods of use.

2. A blowpipe head as defined in claim 1, in which said baffle is provided with a plurality of notches in the sides thereof adapted to form, with the inner wall of said chamber, a plurality of restricted channels connecting said upper and lower passages.

3. A blowpipe head for producing a plurality of high temperature heating flames, comprising an elongated metal body having a cylindrical chamber formed therein; a combustible mixture inlet leading to the upper portion of said chamber; a plurality of outlets leading from the lower portion of said chamber; and a rectangular baffle disposed within said chamber, each of the four corners of said baffle engaging the inner surface of said chamber and said baffle dividing said chamber into upper and lower passages, said baffle and said chamber being of such a size relative to each other that each of said passages is sufficiently small to cause the combustible mixture to flow through said head with a velocity sufficient to prevent pre-ignition of the combustible mixture within said head during relatively long periods of use.

4. A blowpipe head as defined in claim 1, in which the ends of said chamber are closed by removable plugs.

5. Apparatus for removing scale or other adhering material from a surface of a metal body by the application of high temperature heating flames, such apparatus comprising a blowpipe head having a plurality of outlets for directing high temperature heating flames against such adhering material; and skids, one attached to each end of said head, said skids being formed of hard material highly resistant to heat and wear and adapted to protect said head from the effects of rough usage and said head and said skids being formed so as to provide cooperating tongue and groove connections whereby said skids may be slid into place from either end of said head.

6. Apparatus for removing scale or other adhering material from a surface of a metal body by the application of high temperature heating flames, such apparatus comprising a blowpipe head having a plurality of outlets for directing high temperature heating flames against such adhering material; and skids, one attached to each end of said head, said skids being formed of hard material highly resistant to heat and wear and adapted to protect said head from the effects of rough usage and each skid being provided with a rearwardly and downwardly extending leg, the lower end of which is spaced inwardly from the end of said head.

7. Apparatus for removing scale or other adhering material from a surface of a metal body by the application of high temperature heating flames, such apparatus comprising a blowpipe head having a plurality of outlets for directing high temperature heating flames against such adhering material; and skids, one attached to each end of said head, said skids being formed of hard material highly resistant to heat and wear and adapted to protect said head from the effects of rough usage and each of said skids substantially covering an end of said head and extending downwardly to a point below the remainder of said head, whereby said head may be moved along said surface while resting on said skids.

8. Apparatus for removing adhering material from a surface of an article by the application of high temperature heating flames, such apparatus comprising a blow pipe head having an elongated body provided with a group of outlets disposed longitudinally thereof for directing high temperature heating flames against such material; a skid attached to either end of said body and formed of material substantially harder and more resistant to heat and wear than said body, said skids being adapted to protect the ends of said body from the effects of rough usage; and other skids also formed of metal more resistant to heat and wear than said body, said last-named skids being secured to said body on either side of and adjacent said group of outlets.

9. Apparatus for removing adhering material from a surface of an article by the application of high temperature heating flames, such apparatus comprising a blowpipe head having an elongated body tapering downwardly and provided with a group of outlets, disposed in a longitudinal row at the bottom of said body, for directing high temperature heating flames against such material; a skid attached to either end of said body and formed of material substantially harder and more resistant to heat and wear than said body, said skids being adapted to protect the ends of said body from the effects of rough usage; and other skids also formed of metal more resistant to heat and wear than said body and secured to the tapering sides of said body on each side of and closely adjacent said row of outlets.

10. Apparatus as defined in claim 9, in which the end of each of said first-mentioned skids is substantially triangular in shape and extends downwardly to a point below the end of said body.

11. In apparatus for removing scale from a surface of a ferrous metal body, a blowpipe head for producing a plurality of high temperature heating flames, comprising an elongated body having a combustible mixture chamber formed therein; a baffle comprising a metal strip disposed longitudinally of said chamber and adapted to divide said chamber into upper and lower combustible mixture passages; a plurality of outlets leading from said lower passage, said baffle being provided with a plurality of holes for leading the combustible mixture from said upper passage to said lower passage and for distributing the combustible mixture evenly to said outlets; and plugs secured to said body for closing the ends of said chamber, each of said plugs having a slot on the inner side thereof in which the end of said baffle fits to hold said baffle in position during use of said head and each of said outlets being counterbored at its discharge end to prevent the heating flames from being extinguished by flying scale.

12. Apparatus for removing scale or other adhering material from the surface of a metal body by the application of high temperature heating flames, such apparatus comprising a blowpipe head as defined in claim 1, for directing high temperature heating flames against such adhering material; and skids, one attached to each end of said head, said skids being formed of hard material highly resistant to heat and wear to protect said head from the effects of heat and rough usage, said skids also extending to points spaced from said head adjacent each end thereof, whereby said head may be moved along said surface while resting on said skids and with said plurality of outlets spaced from said surface.

13. A blowpipe head for producing a plurality of high temperature heating flames, comprising an elongated metal body having a chamber formed therein; a combustible gas inlet leading to said chamber; a multiplicity of holes drilled in the lower end of said body at spaced intervals therealong, forming individual apertures through said body each communicating with said chamber, and an equal multiplicity of inserts for said apertures, each insert being respectively relatively permanently secured in each aperture, each insert being provided with an outlet extending therethrough and terminating substantially flush with the surface of said head adjacent the outlet end of said aperture, thereby to provide a plurality of outlets for discharging a plurality of combustible gas jets from said head to form said plurality of heating flames.

14. A blowpipe head for producing a plurality of high temperature heating flames, comprising an elongated metal body having a chamber formed therein; a combustible gas inlet leading to said chamber; a multiplicity of holes drilled in the lower end of said body at spaced intervals therealong, forming individual apertures through said body each communicating with said chamber; and an equal multiplicity of inserts for said apertures, each insert being respectively relatively permanently secured in each aperture, each insert being provided with an outlet extending therethrough and terminating substantially flush with the surface of said head adjacent the outlet end of said aperture, thereby to provide a plurality of outlets for discharging a plurality of combustible gas jets from said head to form said plurality of heating flames, the outlet provided in each insert having a tapering approach section and a relatively long discharge section and formed principally by swaging.

EIBE W. DECK.